May 12, 1970  R. B. MOUW  3,512,090
HYBRID JUNCTIONS AND MIXERS AND MODULATORS
CONSTRUCTED THEREFROM
Filed Oct. 18, 1967  7 Sheets-Sheet 1
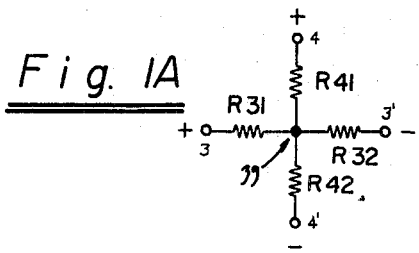
Fig. 1A
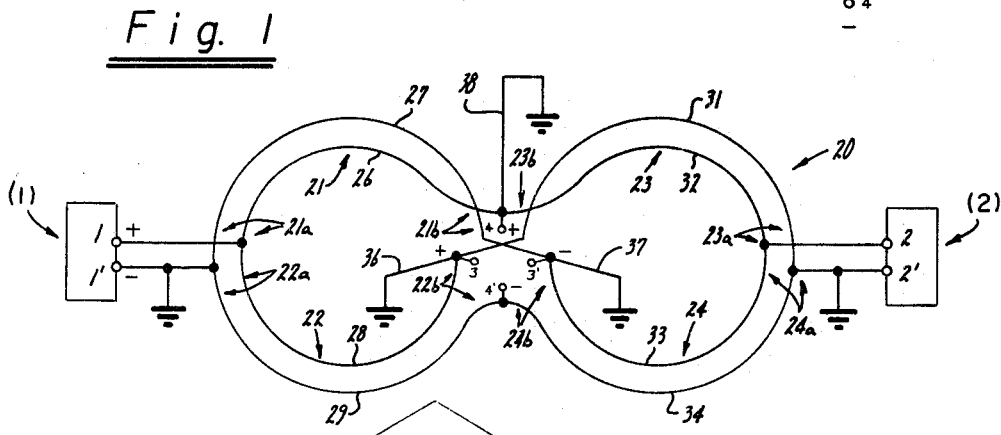
Fig. 1
Fig. 7
Fig. 7A
INVENTOR.
Robert B. Mouw
BY Flehr Hohbach Test
Albritton and Herbert
Attorneys

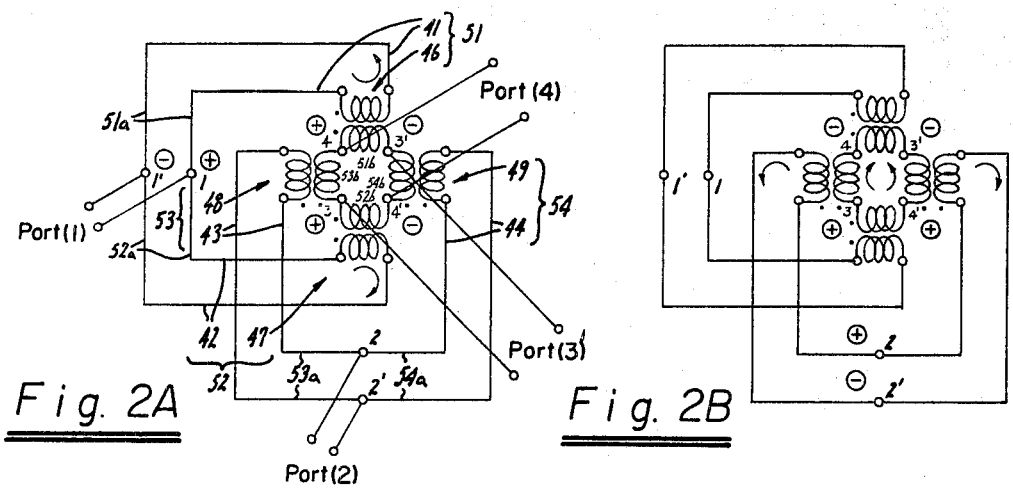
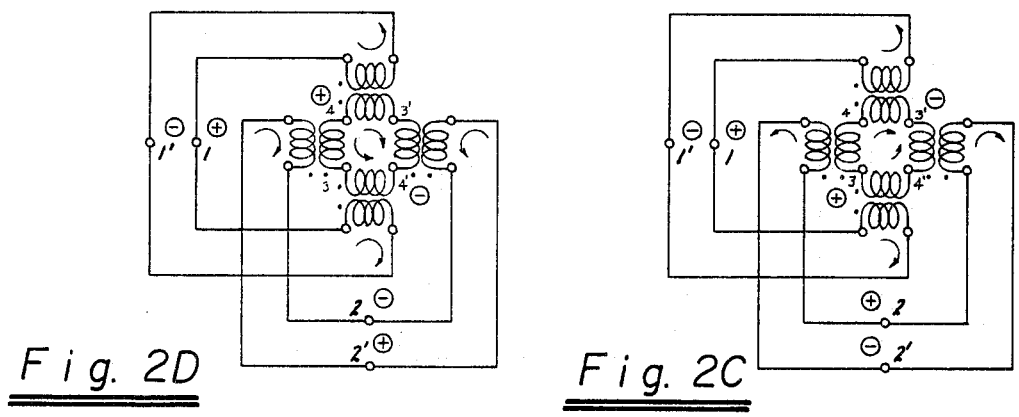
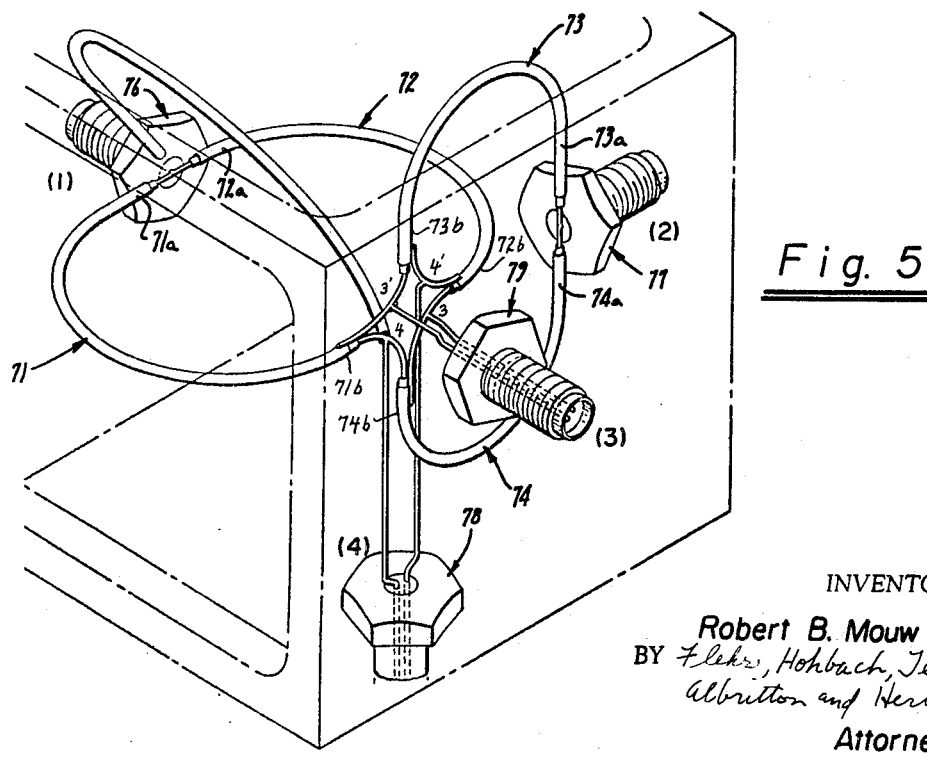

May 12, 1970
R. B. MOUW
3,512,090
HYBRID JUNCTIONS AND MIXERS AND MODULATORS CONSTRUCTED THEREFROM
Filed Oct. 18, 1967
7 Sheets-Sheet 3
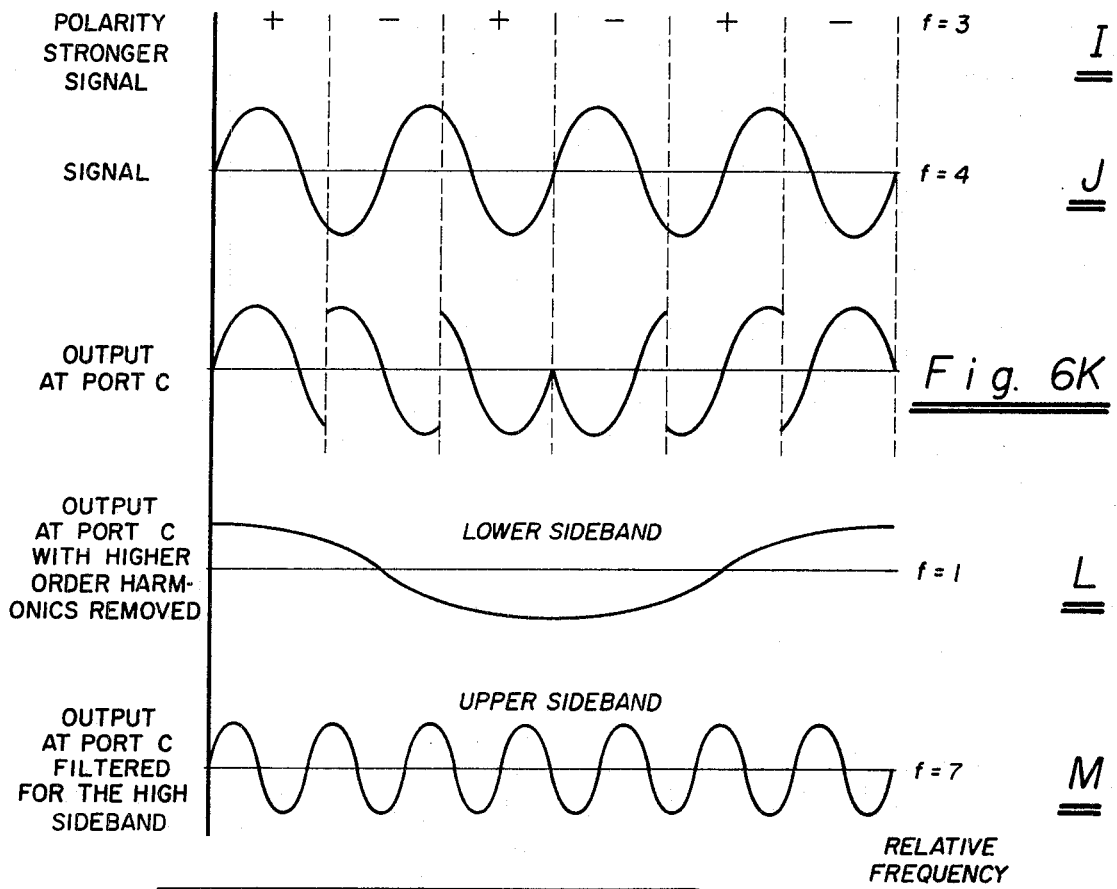
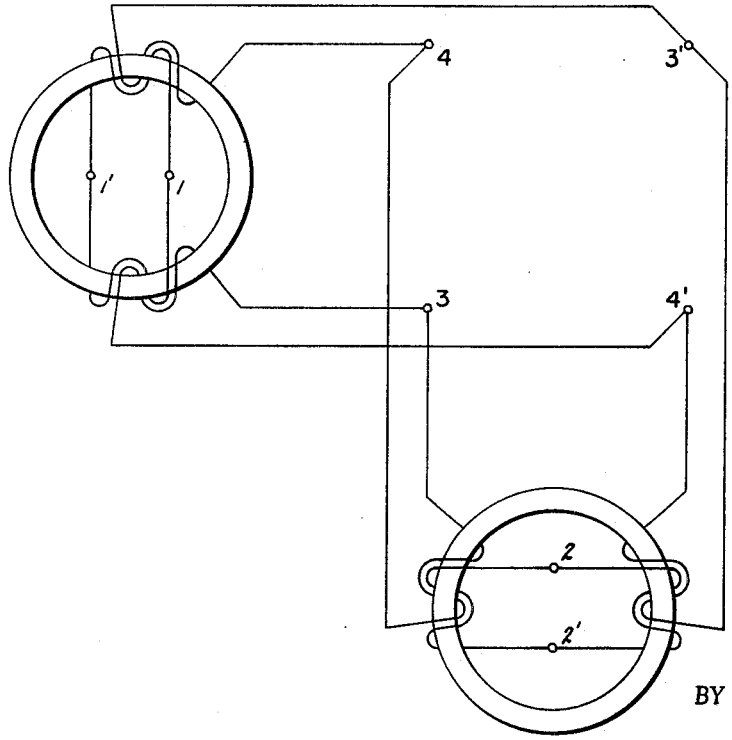
Fig. 3A
INVENTOR.
Robert B. Mouw
BY
Flehr, Hohbach, Test
Albritton and Herbert
Attorneys

FULL WAVE BALANCED
STAR MIXER/MODULATOR

EQUIVALENT CIRCUIT
DIODES NON CONDUCTING

EQUIVALENT CIRCUIT
DIODES 81 & 84 CONDUCTING

EQUIVALENT CIRCUIT
DIODES 82 & 83 CONDUCTING

INVENTOR.
Robert B. Mouw
BY Flehr Hohbach Test Albritton and Herbert
Attorneys

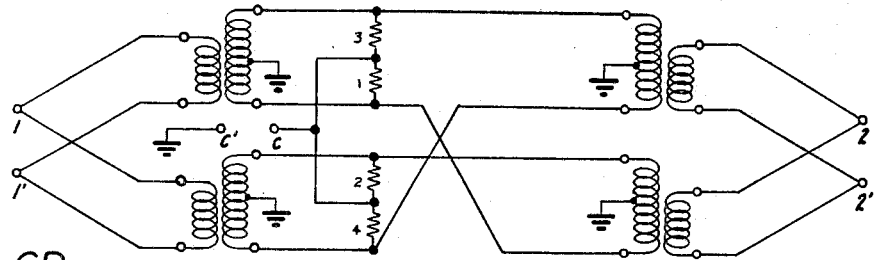
Fig. 6D   DIODES NON CONDUCTING
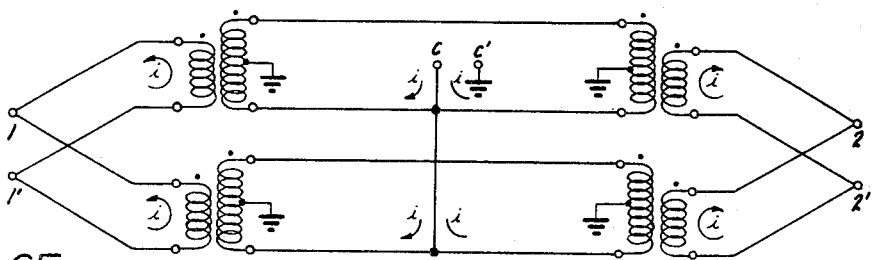
Fig. 6E   DIODES 81 & 84 CONDUCTING (C POSITIVE)
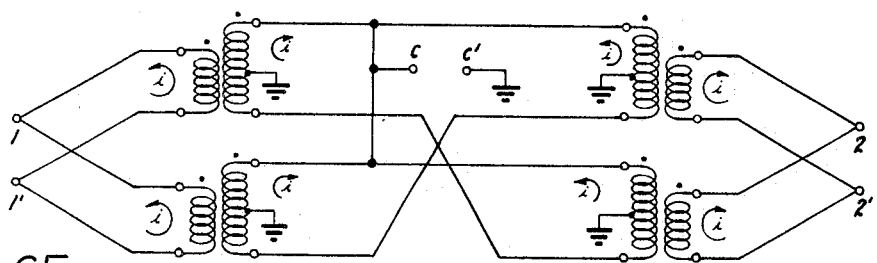
Fig. 6F   DIODES 82 & 83 CONDUCTING (C NEGATIVE)
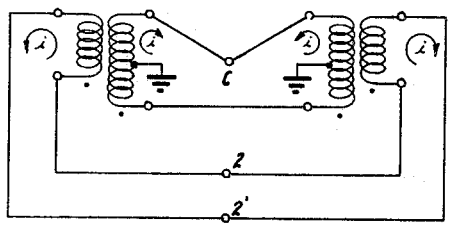
EQUIVALENT CIRCUIT
DIODES 81 & 83 CONDUCTING
Fig. 6G
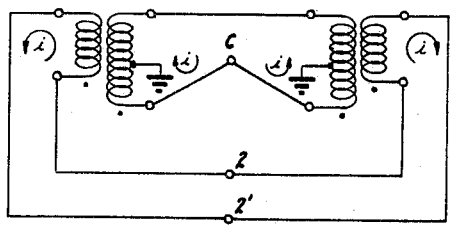
EQUIVALENT CIRCUIT
DIODES 82 & 84 CONDUCTING
Fig. 6H

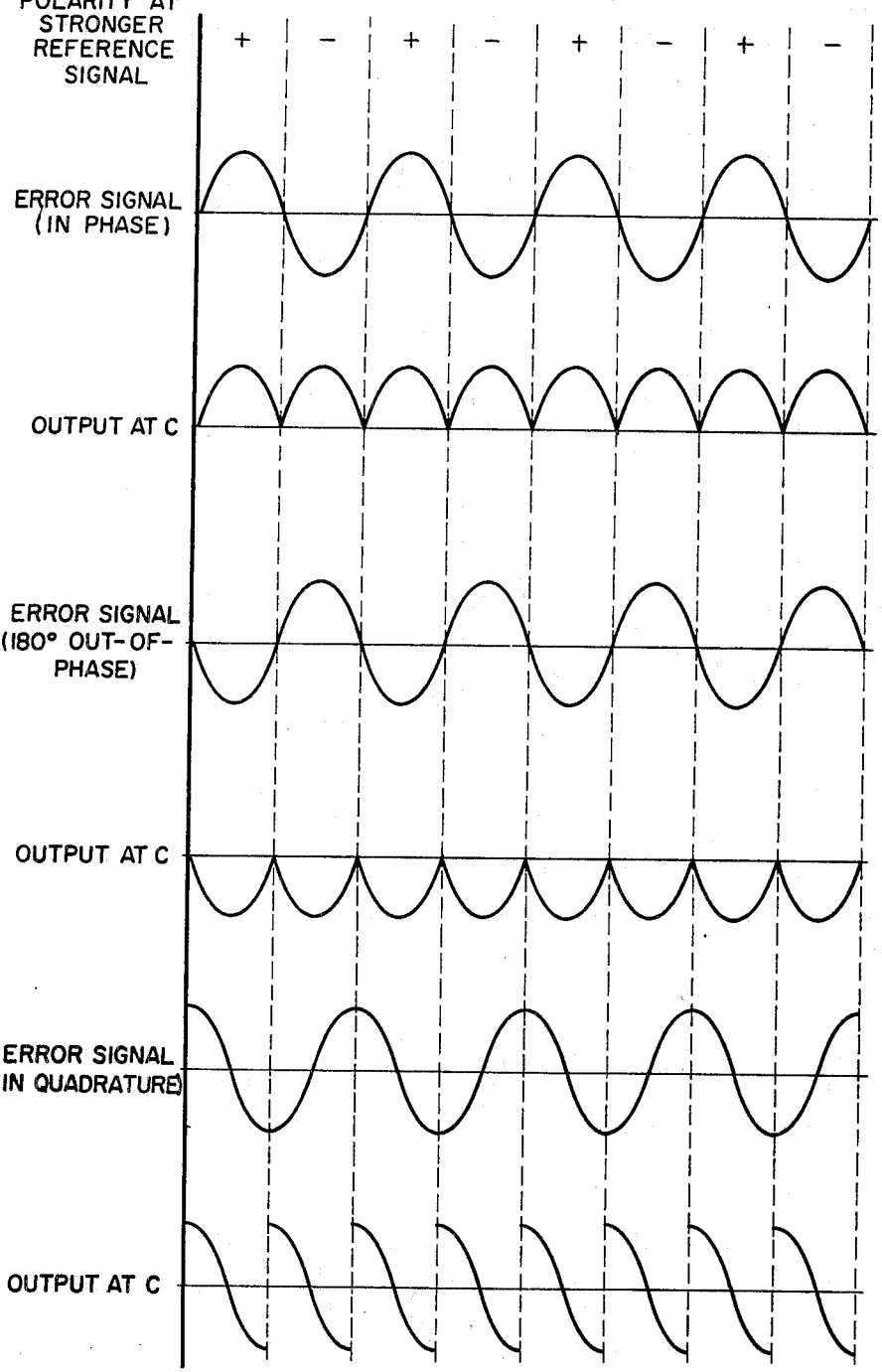

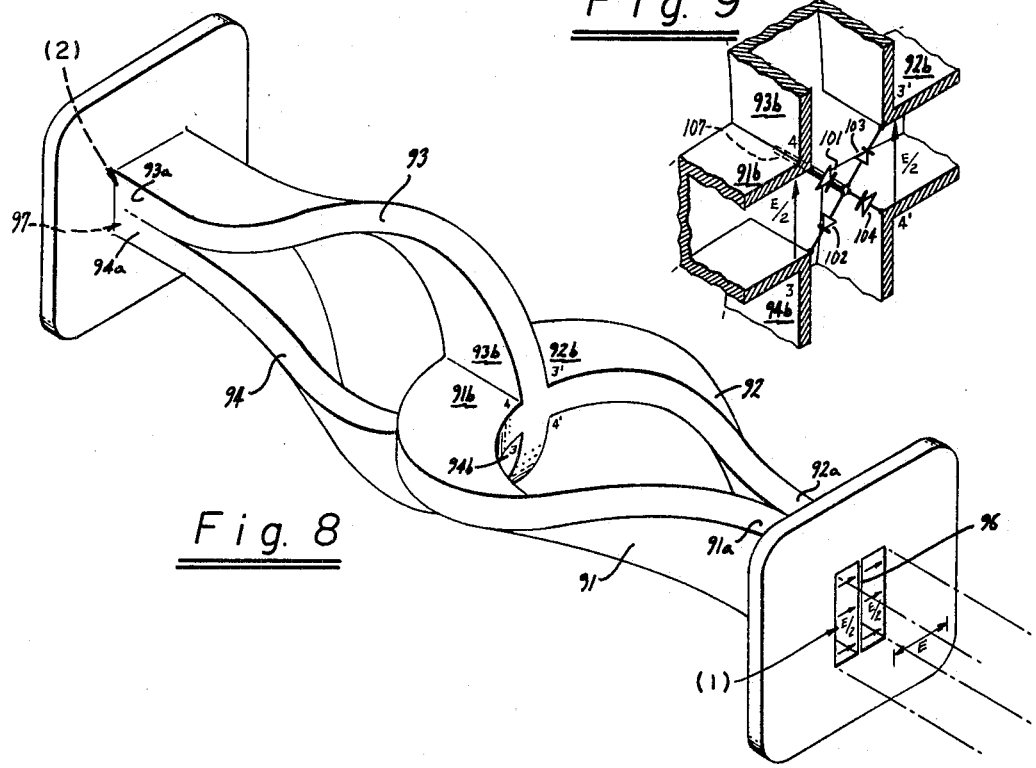

United States Patent Office 3,512,090
Patented May 12, 1970

3,512,090
HYBRID JUNCTIONS AND MIXERS AND MODULATORS CONSTRUCTED THEREFROM
Robert B. Mouw, Palo Alto, Calif., assignor to Aertech, Sunnyvale, Calif., a corporation of California
Filed Oct. 18, 1967, Ser. No. 676,111
Int. Cl. H04b 1/26
U.S. Cl. 325—442                                17 Claims

ABSTRACT OF THE DISCLOSURE

A new type of hybrid junction in which the junction port of the isolated arm is equally excited by two arms connected in parallel to the excited input port. Embodiments in a wide variety of circuits are illustrated including lumped element, two-wire transmission line, coaxial line, microstrip, and waveguide. Mixers and modulators constructed from the hybrid junction are also disclosed.

BACKGROUND OF THE INVENTION

This invention relates to hybrid junctions and to mixers and modulators utilizing such hybrid junctions.

In general, there are known devices of the above character examples of which include the hybrid coil commonly used in telephone repeater circuits, the ring circuit (sometimes called a rat-race), and the hybrid-T (sometimes called Magic T) waveguide junction. A hybrid junction generally consists of a four-port device which, when properly terminated in external impedances, couples a signal input at either of ports (1) and (2) to ports (3) and (4), but not to the other one of ports (1) and (2). Similarly a signal input at either ports (3) or (4) is coupled to ports (1) and (2), but not to the other one of ports (3) and (4). In general, hybrid junctions are divided into two broad categories with respect to applications. The first category relates to signal processing in which the ports of the hybrid junction are interconnected to transmission lines or system components. The second major application utilizes devices such as diodes and transistors which are connected to selected ports of the hybrid. One such device is a balanced mixer or modulator which is arranged so that two of the four ports of the junction are connected together with other elements to form an overall three port device. In the present discussion the ports of a four port junction will be designated by (1), (2), (3), (4) and the terminals of each port by the number pairs (1, 1'), (2, 2'), (3, 3'), and (4, 4'). The third port of the mixer or modulator constructed from a hybrid junction will be designated by the capital letter (C) and its terminals by the letter pair (C, C'). Where access to a port occurs over regions, as in hollow waveguide structure, it will be assumed that equivalent points of access exist at localized points or terminals.

In general, mixer-modulators incorporating known hybrid junctions have been limited due to frequency dependence of operation, failure of isolation between appropriate ports, sensitivity to the conductivity or impedance of sources or loads connected at various ports. Such equipment has also had the disadvantage of requiring large bulky arrays including two rat-race circuits or two Magic-T circuits. Accordingly, there is a need for a new and improved hybrid junction and mixer-modulator derived therefrom.

SUMMARY OF THE INVENTION

In general, it is the object of the present invention to provide a new and improved hybrid junction and mixer or modulator which will overcome the above limitations and disadvantages.

Another object of the invention is to provide a hybrid junction and mixer or modulator of the above character which provides complete, frequency insensitive isolation between specified ports as an inherent result of its design.

Another object of the invention is to provide a hybrid junction and mixer or modulator of the above character with realizations in lumped element circuits, coaxial line circuits, stripline or microstrip circuits, waveguide circuits and other single phase transmission line circuits.

Another object of the invention is to provide a hybrid junction and mixer or modulator of the above character which is particularly simple to construct.

Another object of the invention is to provide a hybrid junction and mixer or modulator of the above character which does not depend upon cancellation of out-of-phase signals or matching of signals to achieve isolation between ports.

Another object of the invention is to provide a hybrid junction and mixer or modulator of the above character which is particularly adaptable for use with self-shielding coaxial line sections so that radiation and radiation coupling between the components and ports is reduced to a minimum.

Another object of the invention is to provide a hybrid junction of the above character which when combined with star network of diodes forms a full-wave balanced mixer or modulator.

Another object of the invention is to provide a mixer or modulator of the above character in which extraction of the bias or modulation signal is frequency independent.

Another object of the invention is to provide a mixer or modulator of the above character which provides simple grounding of transformer center taps in the lumped element version, eliminating the need for frequency dependent by-pass elements or filters in microwave versions, and which provide an extremely wide bandwidth of the bias or modulation port (C).

Another object of the invention is to provide a modulator or mixer of the above character which is particularly adapted for the utilization of closely matched, balanced pairs of chip type circuits, such as integrated circuits, for creating port (C).

Another object of the invention is to provide a mixer or modulator of the above character which provides direct access to the bias or modulation terminal.

These and other objects are achieved by the discovery of a new type of a hybrid junction which includes first, second and third and fourth circuit sections each having first and second ends. The first ends of the first and second sections are connected parallel to from a first port (1) to the junction and the first ends of the third and fourth circuit sections are connected in parallel to form a second port (2). The circuit sections can consist of separate pairs of parallel transmission lines, waveguides or transformers. The second ends of the circuit sections are connected together in a pattern in which four central terminals are formed by connecting the second end of the first circuit section with a portion of each of said second ends of, and in series with, third and fourth circuit sections; and further, in which the second circuit section is connected with the remaining portions of, and in series with, each of the third and fourth circuit sections. The interconnection is arranged so that the electromagnetic excitation in either of the first and second ports (1) or (2) causes equal potentials to be applied across the second ends of each of the circuit sections connected to the other of ports (1) or (2) so that no propagation of energy can take place in such circuit sections. More simply stated, the second ends of the circuit sections are connected to form conjugate ports (3) and (4), each terminal pair (3, 3'), (4, 4') of which is connected in series with only a portion of each of the first, second, third, and fourth circuit sections so that no circuit section terminates directly across any other circuit section. When ports (3) and (4) are connected together with a star arrangement of diodes to form a bias or modulation port (C), a particularly useful mixer or modulator results.

These and other features and objects of the invention will appear from the following description and claims when taken in conjunction with the accompanying drawings.

DESCRIPTION OF THE DRAWINGS

FIG. 1 is a circuit diagram of a hybrid junction constructed according to the invention with two wire transmission line circuits.

FIG. 1A is a portion of a circuit diagram illustrating a method for computing terminal impedances of the circuit of FIG. 1.

FIGS. 2A, 2B, 2C, 2D are circuit diagrams of a hybrid junction constructed according to the invention with lumped element type circuits.

FIG. 3A is a hybrid junction constructed according to the invention with lumped element circuit and toroidal transformers.

FIG. 3B is a modified hybrid junction similar to that of FIG. 3A.

FIG. 5 is a perspective view of a hybrid junction constructed according to the invention with coaxial transmission line circuits.

FIGS. 6A–6H are equivalent circuits of FIG. 6 under particular operating conditions.

FIGS. 6I through 6N and 6P through 6U are diagrams and curves of voltages appearing at the ports of the modulator of FIG. 6.

FIG. 7 is a perspective view of a mixer or modulator constructed according to the invention with coaxial transmission line circuits.

FIG. 7A is a detailed circuit diagram of the junction of the coaxial mixer or modulator of FIG. 7.

FIG. 8 is a perspective view of a full wave balanced mixer or modulator constructed according to the invention utilizing a hollow waveguide circuit.

FIG. 9 is a detailed view with portions broken away in cross section of the junction portion of the mixer or modulator of FIG. 8.

DESCRIPTION OF THE PREFERRED EMBODIMENTS

Figure 6:
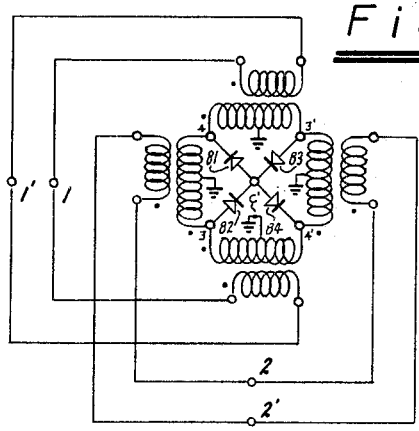
FIG. 6 is a circuit diagram of a mixer or modulator constructed according to the invention and using lumped element circuits.

Hybrid junctions (1) Two-wire transmission line.—Referring particularly to FIG. 1 there is shown a circuit diagram of a hybrid junction constructed from two-wire transmission lines. Thus, there are provided transmission lines forming input ports (1) and (2) generally indicated by the terminal pairs (1, 1') and (2, 2'). The two-wire hybrid junction 0 consists of first, second, third and fourth two-wired transmission line circuit sections 21, 22, 23 and 24, each of which has first and second ends. The first ends are designated 21a, 22a, 23a, and 24a and the second ends are designated 21b, 22b, 23b and 24b. Each of the two-wire transmission line sections 21, 22, 23 and 24 are of equal length and equal characteristic impedance. Preferably, the two-wire transmission line sections are one-quarter wavelength long.

The first ends 21a, 22a of the first and second sections 21 and 22 are connected in parallel to form the first port (1) to the device, and the first ends of 23a and 24a of the third and fourth circuit sections 23, 24 are connected in parallel to form the second port (2). In the following description, let 26, 27 designate the individual wires of line 21; 28, 29 the wires of line 22; 31, 32 the wires of line 23; and 33, 34 the wires of line 24.

Means are provided for interconnecting the second ends 21b, 22b, 23b and 24b of the circuit sections 21, 22, 23 and 24 in a pattern in which the second end 21b of the first circuit section 21 is connected with a portion of each of the second ends of and in series with the third and fourth circuit sections 23, 24. Thus, wire 26 is connected to wire 32 of the third section and wire 27 is connected to wire 33 of the fourth section. Similarly the second circuit section 22 is connected with the remaining portions of and in series with each of the third and fourth circuit sections 23 and 24. This is accomplished by connecting wire 28 to wire 31 of the third circuit section and wire 29 to wire 34 of the fourth circuit section. The designated terminal pairs (3, 3') and (4, 4') formed by the above interconnections constitute the remaining ports (3), (4) of the junction. For simplicity and clarity of drawing, the output wires from ports (3), (4) have been omitted.

It will be noted that none of the second ends of the circuit sections 21, 22, 23 or 24 is connected directly across the second end of any other circuit section.

The operation of the hybrid circuit shown in FIG. 1 is easily derived by assuming various input signals to be applied to the respective ports and deriving the results which follow from such assumption. Thus, assuming that terminal 1 is positive with respect to a reference voltage and that 1' is negative with respect to the reference voltage then terminals 3 and 4 will develop positive voltages while terminals 3' and 4' will develop negative potentials. Since terminals 3 and 4 are connected to transmission line section 23 their equality of potential will prevent any voltage from being developed across such line. Likewise, terminals 3', 4' are connected to the second end 24b of section 24 and will be carried to an equal negative potential. Thus, it is seen that no propagation of energy can take place to port (2) from port (1) since neither one of transmission lines sections 23 and 24 can be excited by excitation at port (1). By symmetry port (1) is not excited by excitation at port (2). It will now be shown that ports (3) and (4) are excited with unequal potentials and accordingly energy will be transmitted to such ports. As indicated port (4) is connected to lines 26 and 29 which lines are of unequal potential, 29 being of negative and 26 being positive. Thus, terminal 4 becomes positive and terminal 4' becomes negative. Likewise port (3) will become excited since it is connected to lines 27 and 28 such that terminal 3 will become positive and terminal 3' becomes negative.

The type of connection is generally characterized by a diagonal connection of each of transmission lines 21 and 22 to lines 23 and 24 in such a way that port (1) is conjugate to port (2) and port (3) is conjugate to port (4). It can be immediately seen that excitation of port (3) directly causes excitation of ports (1) and (2) equally in amplitude, but opposite in phase. However, port (4) is orthogonal with respect to port (3) and accordingly no potential is developed at port (4). Excitation at port (4) transfers in a similar fashion to ports (1) and (2) equally in phase and amplitude while the orthogonal port (3) remains isolated. Preferably one wire of each of the first and second sections is grounded at its input port (1), (2) and short-circuit quarter-wave balancing stubs 36, 37 and 38 are connected respectively to each of terminals 3, 3' and 4 to provide a ground return path from terminals 3,3' and to balance terminal 4. Terminal 4', being connected to both grounded lines of the first and second sections, need not be grounded.

FIG. 1A is a diagram of an imaginary circuit from which the characteristic impedances of the circuit can be derived. Thus, imagine that port (3) is terminated in series connected resistances $R_{31}$ and $R_{32}$ and port (4) is terminated in series connected resistances $R_{41}$ and $R_{42}$. Let $R_3$ equal the sum of $R_{31}$ $R_{32}$ and $R_4$ equal the sum of $R_{41}$ and $R_{42}$. Let each of ports (1) and (2) be terminated in source and load impedances $R_1$ and $R_2$. It has been shown that no potential is developed across $R_2$ due to excitation at port (1) and that port (2) is accordingly isolated from port (1) independent of frequency. A similar statement has been made with regard to transmission of energy from port (2) to port (1) by noting symmetry of the circuit.

If $R_1$ equals $R_2$ excitation at port (3) causes equal potentials to appear each of the terminals 4 and 4' so that port (4) is isolated from port (3) indepedently of frequency. A similar statement has been made with regard to transmission from port (4) to port (3) by noting the symmetry of the network with respect to such ports. Thus, appropriate pairs of ports (1), (2), (3) and (4) have theoretically infinite or complete isolation without regard to the frequency of operation. If $R_1$ equals $R_2$, and if $R_3$ equals $R_4$, then input at ports (1) or (2) will equally couple in amplitude to ports (3) and (4) and inputs at port (3) and port (4) will couple equally in amplitude to ports (1) and (2). Referring particularly again to FIG. 1A, if the resistors terminating ports (3) and (4) are divided into equal pairs of resistors $R_{31}$, $R_{32}$ and $R_{41}$, $R_{42}$ the symmetry of the network becomes more readily apparent.

Recalling that an input at port (1) or port (2) causes the potential between terminal 3' and terminal 4 to be equal and that the potential between terminal 3 and 4' to be equal it is clear that for the condition $R_3$ equals $R_4$ there is no potential difference between the wires crossing at the point designated by the number 39. Thus, an imaginary connection may be made at the intersection 39 between the wires connecting the four resistors $R_{31}$ $R_{32}$, $R_{41}$, $R_{42}$, without affecting the operation of the network. Accordingly, each of the lines 21, 22 which are then connected to port (1) is terminated in one-half $R_3$ plus one-half $R_4$. Current leaving ports (3) and (4) are equal and inputs at port (1) or (2) are coupled equally in amplitude to ports (2) and (4). Similar reasoning shows that inputs at ports (3) and (4) are coupled equally in amplitude to ports (1) and (2).

As previously mentioned excitation at port (3) produces equal potentials at terminal pair (4, 4'). Thus, the voltage appearing across terminals 4 and 3' equals the voltage appearing across terminals 3 and 4' each of which excites the line pair circuit section 21 and 22 connected to port (1). The same reasoning obviously holds true for the excitation of port (2). Accordingly a potential driving port (3) couples equally to ports (1) and (2) but oppositely in phase. An input to port (4) is easily analyzed in the same manner, but because of the choice of terminal polarities an input to port (4) couples to ports (1) and (2) equally in amplitude and phase.

It will be noted that a source with internal resistance $R_1$ equals $R_2$ connected to either ports (1) or (2) will see essentially two parallel transmission lines at equal length terminated in one-half $R_3$ plus one-half $R_4$ which is equal to $R_3$ or $R_4$ itself. Thus, a frequency independent perfect impedance match requires that $R_3$ equal $R_4$ equal $2R_1$, equal $2R_2$.

The hybrid junction which has just been described is defined as a four port network which is properly terminated and has the property that energy is transferred from any port to only two of the remaining three ports; and as is often desirable, this energy is equally divided between the two ports when properly terminated.

The hybrid junction of the invention is characterized by four major functional properties.

(a) Outputs are co-phasal (0° phase difference) for an input at either of two ports. Outputs are contra-phasal (180° phase difference) for an input at either of the remaining two ports.

(b) Two of the four ports are balanced and are designed to be connected to sources or loads balanced with respect to a common ground terminal. The remaining two ports are designed to be connected to unbalanced sources or loads with a common ground terminal. (In the lumped element form to be described, these ports may also be connected to sources or loads which are balanced with respect to a common terminal.) Table A illustrates these properties.

TABLE A

| A source connected to port | Transfers to ports | And is isolated from ports |
|---|---|---|
| (1) (unbalanced) | (4) and (3) (balanced co-phasal). | (2) (unbalanced). |
| (2) (unbalanced) | (4) and (3) (balanced contra-phasal). | (1) (unbalanced). |
| (3) (balanced) | (1) and (2) (unbalanced contra-phasal). | (4) (balanced). |
| (4) (balanced) | (1) and (2) (unbalanced co-phasal). | (3) (balanced). |

(c) The alternatives in (a) and (b) above may be selected independently.

(d) Frequency independent, infinite isolation subject only to circuit imperfections is inherent in the design.

(2) Lumped element circuits.—Referring to FIG. 2A there is shown a hybrid junction 40 constructed according to the invention and using transformer coupling. Thus, ports (1) and (2) indicated again by terminal pairs (1, 1'), (2, 2') are connected by four wire pairs 41, 42, 43, 44 to transformers 46, 47, 48, 49 respectively, each of which has a primary and secondary winding, as shown. Each wire pair and associated transformer constitutes a circuit section numbered 51, 52, 53, 54 which has a first end as indicated at 51a, 52a, 53a and 54a and a second end which comprises the output terminals of the secondary of the respective transformer as indicated at 51b, 52b, 53b and 54b.

The first ends 51a, 52a of the fisrt and second circuit sections are connected in parallel to form port (1) and first ends 53a, 54a are connected in parallel to form port (2).

Again, as is the case of the transmission line hybrid previously described, the second ends are connected by suitable means in a pattern in which the second end 51b of the first circuit section 51 is connected with a portion of each of the second ends of and in series with the third and fourth circuit sections 53, 54. Similarly the second circuit section 52 is connected with the remaining portions of and in series with each of the third and fourth circuit sections 53 and 54. The designated terminal pairs (3, 3') and (4, 4') formed by the above interconnections constitute the input to the remaining ports (3), (4) of the junction, the output wires being included and shown as diagonal lines passing away from the junction.

In the following description of the operation of the hybid junction of FIG. 2A each of the four ports will be excited in turn and it will be demonstrated in each case that the definition of a four port hybrid junction is satisfied and that the properties of Table A apply.

Excitation at Port (1), (FIG. 2A).—For terminal 1 positive at some instant, current leaves terminal 1 and enters the dots of the parallel connected primaries. Current enters the dots of the secondaries causing terminal 4 to be positive with respect to terminal 4' and terminal 3 to be positive with respect to terminal 3'. Equal and opposite currents flow in the transformer windings associated with port (2) inducing no voltage at terminal pair (2, 2'). Thus excitation at terminals 1, 1' transfers to terminal pairs (4, 4') and (3, 3') equally in amplitude and phase while terminal pair (2, 2') is isolated.

Excitation at port (2), (FIG. 2B).—For terminal 2 positive at some instant, current leaves terminal 2 and enters the dots of the parallel connected primaries. Current enters the dots of the secondaries causing terminal 4 to be negative with respect to terminal 4' and terminal 3 to be positive with respect to terminal 3'. Equal and opposite cuurents flow in the transformer windings asociated with (1, 1') inducing no voltage at port (1). Thus excitation at terminals (2, 2') transfers to terminals 1, 4' and 3, 3' equally in amplitude but oppositely in phase while port (1) is isolated.

Excitation at port (3), (FIG. 2C).—For terminal 3 positive with respect to terminal 3' at some instant, current leaves terminal 3 and enters terminal 3' inducing current to enter the dots in the transformer windings associated with (1, 1') and causes terminal 1 to be positive with respect to 1'. Current enters the dots in the windings associated with (2, 2') causing terminal 2 to be positive with respect to 2'. Terminal pair (4, 4') is orthogonal with respect to terminal pair (3, 3'), no potential is developed at terminal pair (4, 4'). Thus excitation at terminal pair (3, 3') transfers to terminal pairs (1, 1') and (2, 2') equally in phase and amplitude while terminal pair (4, 4') is isolated.

Excitation at port (4), (FIG. 2D).—For terminal 4 positive as some instant, current leaves terminal 4 and enters terminal 4' inducing current to enter the dots in the transformer windings associated with (1, 1') and causes terminal 1 to be positive with respect to 1'. Current leaves the dots in the windings associated with (2, 2') causing terminal 2 to be negative with respect to 2'. Terminal pair (3, 3') is orthogonal with respect to terminal pair (4, 4') and no potential is developed at terminal pair (3, 3'). Thus excitation at terminal pair (4, 4') transfers to terminal pairs (1, 1') and (2, 2') equally in amplitude but oppositely in phase while terminal pair (3, 3') is isolated.

Thus, the definition of hybrid junction is satisfied by the lumped element hybrid junction and the properties (a) through (c) are satisfied. The isolation property given in (d) is also satisfied in design principle in that any variation with frequency due to core permeability, primary self-inductance, and the like, occurs in such a way that all transformer windings are affected equally and the symmetry required for balance is maintained.

(3) Other lumped element hybrid realizations.—A number of other possible realizations exist for the hybrid junction circuit of FIG. 2A. Perhaps the most straightforward is the replacement of the mutually coupled windings of FIG. 2A with cored transformers as shown in FIG. 3A. Toroidal transformers are shown, however, many types of transformers are suitable. If a pair of windings are wound on the same core as shown, the sense of the windings must be chosen such that current aids the flow of magnetic flux within a core for excitation at ports (1) or (2). This realization is suitable for frequency ranges in which transformers are useful.

A form more suitable for the frequency ranges above approximately 30 mHz. is the configuration shown in FIG. 3B. Broadband transformers using bifilar windings on ferrite cores are used after the method of Ruthroff C. L. Ruthroff—"Some Broad-band Transformers," Proc. IRE vol. 47, August 1959, pp. 1337–1342). Higher frequency performance is possible with these transformers due to the low inductance bifilar windings which pass over at high frequencies into two wire transmission line baluns. The wire and insulation size are chosen for the proper two-wire transmission line characteristic impedance. If the characteristic impedance is chosen to be twice that of equal source or load resistances connected to ports (1) or (2), then frequency independent transmission is possible if the loads or sources connected to terminal pairs (4, 4') and (3, 3') equal the transmission line characteristic impedance. If it is required that all terminations be equal, the length and characteristic impedance of the bifilar two-wire transmission line should be equal to 2R and $\lambda_o/4$ where R is the termination resistance and $\lambda_o$ is the wavelength at band center. The low frequency performance is provided by the transformer action of the windings n and is limited by their number and the core permeability. The high frequency performance is limited by parasitic inductance, capacitance, core loss and the generation of higher order modes. The limitations mentioned apply to transmission loss rather than isolation which is a function of circuit symmetry alone. Since the general connection pattern follows those previously described, detailed descriptions of these realizations need not be given.

Figure 4:
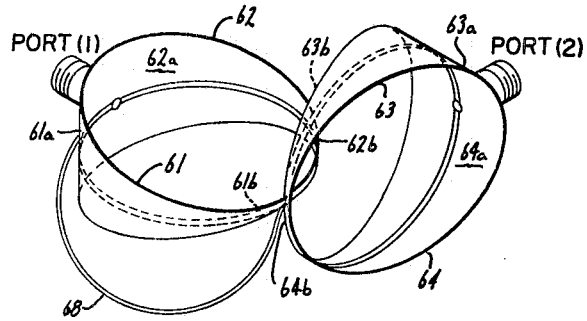
FIG. 4 is a perspective view of a hybrid junction constructed according to the invention utilizing microstrip circuit sections.
Figure 4A:
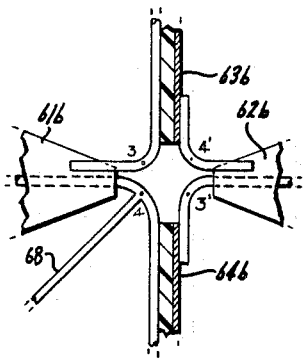
FIG. 4A is a detailed view of the junction connections of the hybrid junction of FIG. 4.

(4) Microstrip circuit sections.—If the lines of a two-wire transmission line are broadened and flattened, the transmission lines characteristics pass over into the microstrip version of the hybrid junction as shown in FIGS. 4A and 4B. The selection of line length, termination resistance and transmission line characteristic impedance are governed by the same considerations as that for the two-wire hybrid. Two of the short circuited quarter wave stubs used in the two-wire hybrid are unnecessary for microstrip hybrid junctions since a return path is available on the backside of the ground plane conductor. The stub or balancing wire connected to terminal 4 is required, however, if good symmetry and high isolation is desired.

In general the microstrip version consists of four microstrip circuit sections 61, 62, 63 and 64 each having first ends 61a, 62a, 63a and 64a and second ends 61b, 62b, 63b and 64b. The first ends 61a, 62a of the first and second circuit sections are connected in parallel to form port (1) and first ends 63a, 64a are connected in parallel to form port (2).

Again, as in the case of the transmission line hybrid as previously described, the second ends are connected by a suitable means in a pattern in which the second end 61b of the first circuit section is connected with a portion of each of the second ends 63b, 64b of and in series with the third and fourth sections 63, 64. Each of the microstrip transmission line sections is provided with a tapered ground plane and dielectric portion at its second end to improve impedance match at the junction. The strip conductor of section 61 is connected to the strip conductor of section 64 and the ground plane of 61 is connected to strip conductor of section 63. Similarly the second end 62b of the second circuit section 62 is connected with the remaining portions of the second ends 63b, 64b and in series with each of the third and fourth circuit sections 63 and 64 by having its ground plane conductor connected to the ground plane conductor of section 63 and its strip conductor connected to the ground plane conductor of section 64. By analogy, the terminals 3, 3' and 4, 4' are numbered and correspond to like terminals previously to form ports (3) and (4). The operation of the entire device follows the same reasoning previously presented. Balancing wire 68 is connected to ground at port (1).

(5) Coaxial transmission line circuit section.—Referring particularly to FIG. 5 there is shown a hybrid junction constructed according to the invention and utilizing coaxial transmission lines. Coaxial transmission lines are a natural extension of the previously described configuration with microstrip transmission lines. Thus, the selection of line length termination resistance and transmission line characteristic impedance are made in the same manner as suggested previously. Thus, as shown the coaxial waveguide sections 71, 72, 73 and 74 can be mounted in a suitable grounded enclosure 75 and are connected to terminals 76, 77 secured to the enclosure. Each of the coaxial transmission line sections has first ends indicated by 71a, 72a, 73a and 74a. The first ends 71a, 72a of the first and second coaxial circuit sections are connected in parallel at terminal 76 and the first ends 73a, 74a are connected in parallel at terminal 77. As in the case of the previously described hybrid junctions the second ends are connected by suitable means in a pattern in which the second end 71b of the first coaxial circuit section is connected with a portion of each of the second ends 73b, 74b of and in series with the third and fourth circuit sections 73, 74. In particular the center conductor of section 71 is connected with the center conductor of section 74 while the outer conductor is connected with the center conductor of section 73. Similarly the second circuit section 72 is connected with the remaining portions of and in series with each of the third and fourth circuit sections 73 and 74, the outer conductor of section 72 being connected to the outer conductor of section 73 and the inner conductor being connected to the outer conductor of section 74. The labeling of the terminal pairs (3, 3'), (4, 4') follows that previously used and is identical to that shown in connection with FIG. 4 and the reasoning previously derived is immediately applicable to this configuration to show that it is also a hybrid junction having the properties set forth in Table A.

In configuration, the coaxial sections 71, 72 are orthogonal to section 73, 74, such that the respective sections lie in planes which intersect at right angles to each other. This configuration has proved to be quite practical in that physical crossing of the conductors is not required, and the orthogonal placement reduces undesired electromagnetic cross-coupling.

The use of coaxial transmission line is particularly advantageous since such lines are now available having outer conductor diameters as small as is practical and with limiting higher order mode frequencies in excess of the frequency ranges available in associated components and devices.

The output ports (3) and (4) are fully illustrated in FIG. 5 and consist of two-wire line connected to a two-wire coaxial output terminals 78 and 79.

Balanced mixer or modulator

The various hybrid junctions heretofore discussed have considerable practical application as a balanced mixer or modulator component. Functions which a full wave balanced mixer or modulator will perform but which may not require all of these characteristics are frequency conversion, phase detection, voltage variable attenuation, frequency doubling and phase switching. In general, the following are the necessary conditions for a practical full wave balanced mixer-modulator.

(a) There must be three ports (terminal pairs) with a common ground terminal. Designate these ports: port (1), port (2) and port (C).

(b) Each port should be isolated from another over a broad frequency range (by virtue of balance rather than frequency sensitive elements) for a zero D.C. bias condition at port (C). This isolation should be independent of power from zero power input to some specified upper power limit.

(c) Transmission from port (1) to port (2) must be continuously variable from a condition of high insertion loss without bias to a condition of low insertion loss upon application of D.C. bias at port (C). A differential phase shift of 180° in the transmission from port (A) to port (B) must accompany a polarity change in the bias at (C).

(d) The effect of D.C. bias at port (C) should not depend on the D.C. conductivity of sources or loads connected to ports (1) and (2).

(e) The statement made in (c) above should be applicable to instantaneous transmission from port (1) to port (C), or port (2) to port (C) except that the rate of variation of the transmission is required only to cover the operating frequency range of ports (1) and (2).

The disclosed circuit configurations eliminate the major difficulties previously encountered with ring type mixer or modulators and utilizes the hybrid junctions of the present invention. The circuit will be initially analyzed in a lumped element version followed by derivation of other high frequency and microwave transmission line coupling networks.

(6) Full wave balanced star mixer or modulator using lumped elements.—Referring particularly to FIG. 6 there is shown a lumped element hybrid junction which is the same as that shown and described in detail in connection with FIG. 2 and like parts have been given like numbers. The dots indicate that current flowing into the dot in the primary corresponds to current flowing into the dot in the secondary and vice versa.

The junction has additional elements consisting of grounded center taps in the secondary windings of the transformers 46, 47, 48 and 49. At least four diodes 81, 82, 83 and 84 are connected together in a star configuration in which one end of each diode is connected to a common terminal labeled C and the other end of each diode is connected to one of the terminals of the terminal pairs (3, 3') and (4, 4'). The diodes at each of the respective terminal pairs (3,3'), (4, 4') are oriented in opposed conduction direction to each other. Furthermore, the diodes connected to terminal pair (3, 3') are further oriented in a conduction direction which is opposite to that of the diodes connected at the two terminal pairs (4, 4'). The circuit as shown in FIG. 6 obviously satisfies the requirements of (a) and (d) above.

The basic operation of the circuit of FIG. 6 enables it to be used as a modulator, voltage variable attenuator, or phase reversing switch. The following describes a modulator or voltage variable attenuator or phase reversing switch.

Figure 6A:
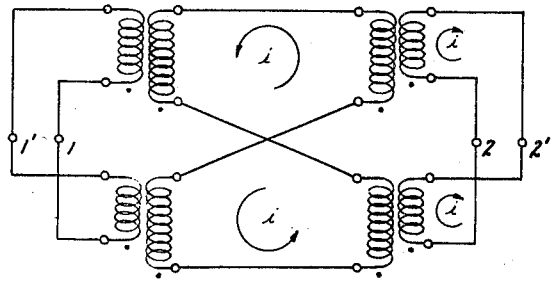

Referring to FIG. 6A, there is shown the equivalent circuit for all diodes unbiased. In this state, the currents $i$ flowing from terminal 2 into the parallel connected primaries induce equal and opposite currents in the series connected secondaries and terminal pair (1, 1') is isolated from terminal pair (2, 2'). This satisfies requirement (b) above. In the equivalent circuit of FIG. 6B, bias current entering terminal C causes diodes 81 and 84 to conduct, connecting the secondaries in parallel and direct transmission is possible from (2, 2') to (1, 1'). In the equivalent circuit of FIG. 6C bias current leaving terminal C causes diodes 82 and 83 to conduct again connecting secondaries in parallel but reversing the phase of transmission by interchanging the paths of transmission.

Figure 6B:
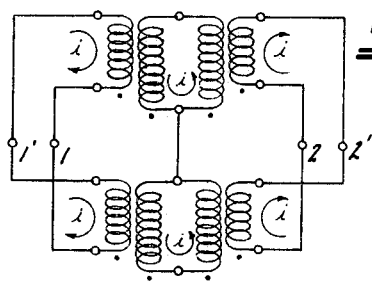
Figure 6C:
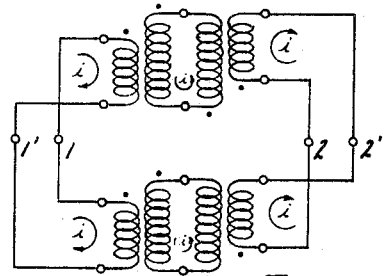

The states shown in FIG. 6B (diodes 81 and 84 conducting, positive bias at C) and in FIG. 6C (diodes 82 and 83 conducting, negative bias at C) correspond to those for the conventional Full Wave Balanced Ring Mixer or Modulator. The diode impedance may be controlled by the magnitude of the bias and the transmission of the circuit in FIG. 6 passes smoothly from the forward transmission state through the intermediate states to the reverse transmission state by variation of the bias at terminal C from a large positive value through zero and to a large negative value. This satisfies requirement (c) above.

It will now be demonstrated that port (C) is isolated from ports (1) and (2) for the zero D.C. bias condition. Let terminal pair (C, C') represent port (C), where C' is a grounded terminal. All the possible paths from terminal pair (C, C') to the other terminal pairs pass through the diodes which are assumed to have no D.C. bias; thus, for signals at (C, C') small enough to preclude diode conduction the equivalent circuit is that of FIG. 6D which is derived from FIG. 6A with some nominal high leakage resistance assigned to each of the diodes. It can be seen from the symmetry of this circuit that equal and opposite currents are induced in each half of the individual transformer secondaries and that terminal pair (C, C') is isolated from terminal pairs (1, 1') and (2, 2') subject only to the requirement that the leakage resistances are equal and that the transformers are balanced. When the signal at (C, C') is of sufficient amplitude to cause diode conduction, the equivalent circuits for the case of positive and negative signals are shown in FIGS. 6E and 6F representatively. For C positive, diodes 81 and 84 conduct as before allowing current flow in half of each secondary winding as indicated by the arrows in FIG. 6E. For C negative, diodes 82 and 83 conduct allowing current flow as indicated by the arrows in FIG. 6E. It will be noted that the direction of current flow in each case is such that the current induced in the primary is the same polarity for either polarity excitation at (C, C'). Thus, for sinusoidal excitation at (C, C'), the output at (1, 1') and (2, 2') is a rectified full wave, or for non-ideal transformers and diodes it is a wave containing only even order harmonics of the signal applied at (C, C'). None of the fundamental signal applied at (C, C') appears at either (1, 1') or (2, 2'), (subject only to the requirement that the diodes and transformers have identical characteristics). This completes the requirements of (b) above. In practice the isolation between any two terminal pairs is of the same order of magnitude since all are primarily dependent on diode similarity and transformer balance.

Thus, it has been shown the Full Wave Balance Star Mixer or Modulator is capable of (i) voltage-variable transmission between ports (1) and (2), (ii) phase of transmission may be switched 180° by changing the polarity of the control bias, and (iii) capabilities in (i) and (ii) allow operation of the device as a balanced modulator where a carried applied to port (1) for example and a modulation signal applied to port (C) results in the two side bands appearing at port (2) with the carried suppressed.

The circuit of FIG. 6 can also operate as a mixer (frequency converter). In demonstrating the balanced modulator capability above, the capability for double balanced frequency conversion was also shown, for the special case of a modulating signal at port (C), the signal to be modulated at either port (1) or port (2) and the converted sidebands at port (2) or (1) respectively. It will now be shown that the two input signals may be applied at ports (1) and (2) with the converted sidebands at port (C).

Since the circuit is symmetric with respect to port (1) and port (2), the signal at (1) and (2) may obviously be interchanged. Thus, if the frequency involved in the fundamental conversion process are $f_1$, $f_2$ and $f_3 = f_1 \pm f_2$, the input signals $f_1$ and $f_2$ may be applied at any two separate ports and the sidebands, $f_3 = f_1 \mp f_2$ may be extracted from the third. This latter statement is subject to the operating frequency range of each of the ports, that of ports (1) and (2) being identical and the range of port (C) extending to D.C.

Referring to FIG. 6, if a signal is applied to (1, 1') of sufficient magnitude to drive the diodes into conduction, diodes 81 and 83 will conduct when 1 is positive and the equivalent circuit is that of FIG. 6G. In this state a second signal at port (2) is transferred directly to C referenced to ground C' through the upper halves of the center tapped secondaries. When 1 becomes negative, FIG. 6H diodes 82 and 84 conduct and a signal at port (2) is transferred to port (C), (reversed in phase), referenced in ground through the lower halves of the center tapped secondaries. In FIGS. 6I–6M, the waveforms are drawn for a typical situation. FIG. 6I is the stronger signal (driving (1, 1'') with a frequency $f_1 = 3$ in arbitrary units). Only the polarity is indicated and it is assumed for clarity that the diodes are perfect switches. The second signal (at 2, 2'), $f_2 = 4$, shown in FIG. 6J appears at (C, C''), FIG. 6K, with its phase of transmission reversed on every half cycle of the strong signal at (1, 1').

The major components of the complex signal at (C, C') are the sidebands $f_2 - f_1 = 1$ and $f_2 + f_1 = 7$. These are shown in FIGS. 6L and 6M, respectively.

The circuit of FIG. 6 can be used as a phase detector. The D.C. component of the output at (1, 1') and (2, 2') is a direct indication of the relative phase of the signals. One of the signals must be strong enough to drive the diodes into conduction. The operation is illustrated by FIGS. 6G and 6H and typical waveforms are shown in FIGS. 6N and 6P through 6U. If the polarity of the stronger signal is assumed as shown in FIG. 6N, then the D.C. component of the output at (C, C') is positive for an in-phase signal (FIG. 6P) as shown in FIG. 6Q, negative (FIG. 6S) for a signal 180° out of phase (FIG. 6R), and zero FIG. 6U) for a signal in quadrature as shown in FIG. 6T.

For the special case where terminals (1, 1') and (2, 2') are driven by the same source, the output waveforms are also those shown in FIG. 6Q and second harmonic content is shown readily by Fourier analysis. Thus, frequency doubling can be obtained also.

Compared to ring configuration, the advantage of the star configuration lies in the existence of a center node which is the junction of the four elements of the star. This junction is used as the ungrounded bias/modulation terminal (terminal C). The availability of this terminal allows simple grounding of the transformer center taps in the lumped element Full Wave Balanced Star Mixer or Modulator. Furthermore, in the microwave transmission line Full Wave Balanced Star Mixer or Modulator, only a common ground return is needed. Thus, the star configuration allows simple grounding of transformer center taps in the lumped element version, eliminates the requirement for frequency dependent by-pass elements or filters in the microwave versions, and also allows the bandwidth of the bias/modulation port (port (C)) to be comparable to that of signal ports (ports (1) and (2)) and to extend to zero frequency (D.C.), even in the microwave version to be described.

7. Coaxial transmission line full wave mixer or modulator.—From the above discussion of the lumped element mixer or modulator it will be apparent that any of the hybrid junctions disclosed above in connection with FIGS. 1, 3, 4, and 5 can be used as the foundation for the construction of a mixer or modulator when assembled with a star diode circuit of the type shown in FIG. 6. Thus, referring particularly to FIG. 7, there is shown a coaxial line hybrid junction in all respects the same as that shown in FIG. 5 together with a star diode circuit connected to the terminals (3, 3'), (4, 4'). In this application of the coaxial hybrid junction the transmission line characteristic impedances are chosen to match the impedance level of the diode circuit. The characteristic impedance should approximate $\sqrt{R_g R_d}$ where $R_g$ is the equal load or source resistances connected to terminal pairs (1, 1'), (2, 2'), and, $R_d$ is the individual diode resistance level at the power level of operation. Otherwise, the theory of operation follows the description given above in connection with FIG. 6. Since there is only one output port, it can be terminated in a simple coaxial connector 86. FIG. 7A is an enlarged circuit diagram of the junction of the coaxial of the mixer or modulator of FIG. 7 both figures being numbered in accordance with the hybrid junction counterpart with the star diode circuit added.

(8) Waveguide hybrid junction mixer or modulator.—Referring to FIGS. 8 and 9, there is shown a hybrid junction and mixer or modulator constructed from hollow waveguide sections.

Thus, there are provided four rectangular waveguide sections 91, 92, 93, 94 which have first ends 91a, 92a, 93a, 94a and second ends 91b, 92b, 93b, and 94b. First ends 91a, 92a of the first and second sections are connected in parallel with broad walls joined together to form a common wall or septum 96 at a first port (1) and first ends 93a, 94a of the third and fourth waveguide sections 93, 94 are connected together in parallel with broad walls joined together to form a common wall or septum 96 at a first port (1) and first ends 93a, 94a of the third and fourth waveguide sections 93, 94 are connected together in parallel with broad walls joined together to form a common wall or septum 97 at a second port (2). The second ends 91b, 92b of the first and second sections are connected together in a pattern in which they are terminated in series with portions only of the third and fourth circuit sections 93 and 94. Thus, the broad walls of waveguide 92 terminate on the broad walls and in series with one side of each of sections 93 and 94 while the second end 92b of section 92 terminates on the broad walls of the other end of sections 93, 94.

Each of the waveguide sections are designed to operate in the $TE_{10}$ mode in which the electric field vector is perpendicular to and extends between the broad walls of the waveguide. The stepwise decreasing width of waveguide occurring at port (1) and port (2) only affects the impedance of the waveguide section, but propagation in the $TE_{10}$ mode still occurs. The electric field $\vec{E}$ is indicated by the arrow at port (1) and this field divides equally between waveguides 91 and 92 and appears as shown at the point of contact with waveguides 93, 94 (see also FIG. 9).

Obviously, waveguide sections 93 and 94 are excited equally and no energy propagates therealong. Thus, electromagnetic energy entering port (1) is isolated from port (2) and by symmetry, the reverse is also true. The extraction of energy from such a junction is somewhat cumbersome if the same were to be used as a hybrid junction. It would be possible to extract terminal pairs (3, 3′) and (4, 4′) by the use of short probes in each of the diagonal corners of the junction but it is believed that this is somewhat impractical. However, such a device is not impractical where full extraction of terminal pairs is not required such as, for example, in the mixer-modulator configuration. Thus, as shown in FIG. 9, diodes 101, 102, 103, 104 can be conveniently connected to the diagonal corners of the junction in the manner shown and such a connection in fully equivalent to the previously described diode star configuration hybrid junction mixer-modulators. When so connected they meet at a common junction C which is connected by a stub 106 to a coaxial connector 107 mounted in a short wall at the center of the waveguide junction.

Connector 107 is normal to (orthogonal) all the fields at the junction and therefore does not deteriorate the performance of the device. The operation of the waveguide mixer modulator follows that previously described in detail in connection with the embodiment of FIG. 6.

By analogy the other hybrid junction configurations can also be combined with the star diode circuit to produce a mixer or modulator. This is quite straightforward and an example is given in FIG. 3B wherein the star diode circuit is shown added in phantom lines together with output port (C).

While it is not essential to an understanding of the invention as herein set forth and claimed, the following analysis is submitted to show that when properly terminated, the transmission line forms of the hybrid junction of the invention have a scattering matrix which is that of the previously known Magic-T junction. The complete analysis is obtained by first computing the admittance matrix and then deriving the scattering matrix. This analysis will not be given in detail. The result is that the simplified scattering matrix coefficients are as follows:

$$S_{11}=S_{22}=\left[\frac{\left(\frac{Z_{01}}{2r}-\frac{R}{Z_{01}}\right)-j\left(\frac{R}{2r}-1\right)\cot\theta}{\left(\frac{Z_{01}}{2r}+\frac{R}{Z_{01}}\right)-j\left(\frac{R}{2r}+1\right)\cot\theta}\right]$$

$$S_{12}=S_{21}=S_{34}=S_{43}=0$$

$$\begin{matrix}S_{31}=S_{13}\\S_{41}=S_{14}\\S_{32}=S_{23}\\-S_{42}=-S_{24}\end{matrix}=\frac{1}{\sqrt{2}}\frac{\sqrt{\frac{R}{2r}}}{\frac{1}{2}\left(1+\frac{R}{2r}\right)\cos\theta+j\left(\frac{R}{Z_{01}}+\frac{Z_{01}}{2r}\right)\sin\theta}$$

$$S_{33}=S_{44}=\left\{\frac{\left(\frac{Z_{01}}{R}-\frac{2r}{Z_{01}}\right)-j\left(\frac{2r}{R}-1\right)\cot\theta}{\left(\frac{Z_{01}}{R}+\frac{2r}{Z_{01}}\right)-j\left(\frac{2r}{R}+1\right)\cot\theta}\right\}$$

and for $R=2r=Z_{01}$;

$$|S|=\frac{1}{\sqrt{2}}\begin{vmatrix}0 & 0 & e^{-j\theta} & e^{-j\theta}\\0 & 0 & e^{-j\theta} & -e^{-j\theta}\\e^{-j\theta} & e^{-j\theta} & 0 & 0\\e^{-j\theta} & -e^{-j\theta} & 0 & 0\end{vmatrix}$$

where $S_{nn}$ is the scattering coefficient seen looking into the $n$th port with all other ports terminated in matched loads, while $S_{nm}$ ($m \neq n$) represents the amplitude of the wave coupled out of the $m$th port for an input incident wave at port $n$ under the same matched load conditions; and where the $Z_{01}$ is the characteristic impedance of the $n$th circuit section; $R_1=R_2=r$, the termination impedance of the first and second circuit section; and $R_3=R_4=R$, the termination impedance of the third and fourth circuit sections.

To those skilled in the art to which the invention pertains many other types of hybrid junctions, mixer or modulators and uses based upon this invention will suggest themselves. Accordingly, it is to be understood that the disclosures and descriptions herein are meant to be illustrative of the invention and its application but are not intended to be taken as a limitation thereon.

What I claim is:

1. In an electromagnetic hybrid junction, first, second, third and fourth circuit sections each having first and second ends, the first ends of said first and second sections being connected in parallel to form a first port to said junction, first ends of said third and fourth circuit sections being connected in parallel to form a second port to said junction, means interconnecting the second ends of said first, second, third and fourth circuit sections in a pattern in which said second end of said first circuit section is connected with a portion of each of said second ends of and in series with said third and fourth circuit section and further in which said second circuit section is connected with the remaining portions of and in series with each of said third and fourth circuit sections, said interconnecting means being constructed and arranged so that electromagnetic excitation at either of said first and second ports causes equal potentials to be applied across said second ends of each of the circuit sections connected to the other port so that propagation of energy cannot take place in such circuit sections and said first and second ports are thereby isolated from each other, and means forming two terminal pairs defining third and fourth ports each of said terminal pairs being connected in series with a portion only of each of said first and second circuit sections, and said third and fourth circuit sections.

2. A hybrid junction as in claim 1 in which said circuit sections comprise two-wire transmission lines.

3. A hybrid junction as in claim 2 wherein each of said two-wire transmission line sections are one-quarter wavelength long.

4. A hybrid junction as in claim 3 in which one wire of each of said first and second sections is grounded and further including short circuit quarter wave balancing stubs connected to each of the terminals of the third and fourth ports except that terminal connected to both of the ground lines of said first and second sections.

5. A hybrid junction as in claim 1 wherein said circuit sections comprise two-wire lumped-element, two-wire circuit sections each of which includes a two-wire line and a transformer having primary and secondary windings, the primary windings being connected to the respective two-wire line and the secondary winding forming the second ends of said circuit section.

6. A hybrid junction as in claim 5 in which said transformers include the toroidal cores.

7. A hybrid junction as in claim 1 wherein each of said circuit sections comprises coaxial wire transmission line sections having an inner conductor and a coaxial outer conductor.

8. A hybrid junction as in claim 7 further including a quarter wave short circuit stub connected to that connection between said first, second, third and fourth circuit sections forming center conductors.

9. A hybrid junction as in claim 1 wherein each of said circuit sections comprises microstrip transmission line sections each having at least a strip conductor and one ground plane conductor separated by a dielectric spacer.

10. A hybrid junction as in claim 9 wherein the ground plane and dielectric spacer at the second ends of each of said first, second, third and fourth microstrip circuit sections are convergingly tapered toward said second end to improve the impedance match between the sections at the interconnection of such said ends.

11. A hybrid junction as in claim 9 further including a quarter wave short-circuit balancing stub connected to the ungrounded interconnection between the second ends of said first, second, third and fourth circuit sections.

12. A hybrid junction as in claim 1 further including a star diode network consisting of at least four diodes connected together in star configuration in which one end of each diode is connected to a common terminal and the other end of each diode is connected to one of the terminals of said third and fourth ports, said diodes being oriented in opposed conduction direction to each other across each of said third and fourth ports and being further oriented in a conduction direction at the third port which is opposite that of the fourth port, said diodes and hybrid junction together forming a balanced three port mixer or modulator.

13. A hybrid junction device as in claim 12 wherein said circuit sections comprise hollow waveguide sections.

14. A hybrid junction and star diode network as in claim 13 wherein said waveguide sections are rectangular having broad and narrow walls adapted to transmit in $TE_{10}$ mode and in which the first, second, third, and fourth waveguide sections intersect each other in pairs, the broad walls are joined together to form the junction, and wherein the ends of the diodes away from their common connection are connected to the intersection of each pair of said broadwalls.

15. A hybrid junction and star diode network as in claim 12 wherein said circuit sections comprise lumped-element, two-wire circuit sections each of which includes a two-wire line and a transformer having primary and secondary windings, the primary windings being connected to the respective two-wire line and the secondary winding forming the second ends of said circuit section.

16. A hybrid junction and star diode network as in claim 12 wherein each of said circuit sections comprises coaxial wire transmission line sections having an inner conductor and a coaxial outer conductor.

17. A hybrid junction and star diode network as in claim 16 further including a quarter wave short-circuit balancing stub connected to the ungrounded interconnection between the second ends of said first, second, third and fourth circuit sections.

References Cited

UNITED STATES PATENTS

| | | | |
|---|---|---|---|
| 2,436,828 | 3/1948 | Ring | 325—446 |
| 2,936,369 | 5/1960 | Lader | 325—445 |

ROBERT L. GRIFFIN, Primary Examiner

A. J. MAYER, Assistant Examiner

U.S. Cl. X.R.

325—445, 446; 333—24